(12) United States Patent
Gill

(10) Patent No.: US 6,757,375 B1
(45) Date of Patent: *Jun. 29, 2004

(54) RECORDAL OF CALL RESULTS IN A PREDICTIVE DIALING APPLICATION

(75) Inventor: Robert Gill, deceased, late of Regina (CA), by legal representative Debra Ann Marie Gill

(73) Assignee: Debra Ann Marie Gill, Regina (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,557

(22) Filed: Mar. 29, 2000

Related U.S. Application Data

(63) Continuation-in-part of application No. 08/953,615, filed on Oct. 17, 1997, now Pat. No. 6,198,814.

(51) Int. Cl.⁷ ................................................ H04M 3/00
(52) U.S. Cl. ................................ 379/265.1; 379/266.08
(58) Field of Search .......................... 379/265.1, 266.08, 379/266.1, 309

(56) References Cited

U.S. PATENT DOCUMENTS

| | | | | |
|---|---|---|---|---|
| 5,341,412 A | * | 8/1994 | Ramot et al. | ................. 379/92 |
| 5,436,965 A | | 7/1995 | Grossman et al. | |
| 5,621,790 A | | 4/1997 | Grossman et al. | |
| 6,198,814 B1 | * | 3/2001 | Gill | ....................... 379/266.01 |

* cited by examiner

*Primary Examiner*—Creighton Smith
(74) *Attorney, Agent, or Firm*—Adams Evans P.A.

(57) ABSTRACT

A method and apparatus for the recordal of call results in a computer database in a predictive dialing application. Operators communicate call results back to the dialing controller using DTMF signals. The system uses a single computer to coordinate, administer and store the results of the campaign, and the need for computer terminals at the operator stations is eliminated, since any DTMF capable device could be used.

9 Claims, 3 Drawing Sheets

RECORDAL OF CALL RESULTS IN A PREDICTIVE DIALING APPLICATION

This application is a continuation-in-part of application Ser. No. 08/953,615 filed Oct. 17, 1997, now U.S. Pat. No. 6,198,814.

This invention is in the field of predictive dialing systems, and more particularly deals with the provision of a low-cost automated method of recording telephone call results in the contact database employed in a predictive dialing campaign.

BACKGROUND

Predictive dialing systems have greatly increased the efficiency of telemarketing operators, allowing them to spend their time talking to prospects rather than doing the mechanical tasks necessary to establish contact with the prospect. These systems automatically dial telephone numbers from a list stored in a prospect database. Busy signals and unanswered calls are recycled for dialing later, and answered calls are put in a queue to await a non-busy operator. Thus the operators are supplied with a steady stream of prospects on answered telephone lines.

Specified information from the database about the prospect can also be displayed to the non-busy operator receiving the call. Various computer programs are used to attempt to match the flow of answered calls to non-busy operators, minimizing both the waiting time for prospects and the idle time for operators.

A further desired feature of such systems is the ability to record the outcome of the calls made back in the prospect database. The system manager is thereby provided with the information he requires about the call results. As well, typically, once all numbers in the database have been dialed, the system starts through the list of telephone numbers again. The results recorded for the previous call to this number will indicate whether the number should be dialed again or skipped.

Present systems employ a computer terminal for each operator, allowing considerable detailed information to be relayed firstly to the operator about the contact, and secondly to the computer database about the outcome of the call. In many applications however, such detailed information is not necessary, and it may not be necessary that the operator have any information about the prospect he is talking to. In some systems, such as that disclosed in U.S. Pat. No. 5,341,412 to Ramot et al., control of the telephone functions is also done through the computer keyboard or mouse. The cost of such a system is high, however, limiting the market for this type of equipment, since in a typical sixteen operator installation there would be at least seventeen computers and a network linking them required, in addition to the dialing controller and sixteen operator telephones, and sixteen to twenty outside telephone lines. Present systems also require a computer network linking all computers to the predictive dialer and the computer database.

A predictive dialing system which eliminated the need for computer terminals at each operator station while continuing to provide for call data feedback from the operators for storage in the campaign database would be desirable. The device would be much simpler to install and manufacture, and obviously the cost would be lower as in the cost of operator computer terminals and their supporting computer network can be eliminated.

This could be accomplished using operator devices, with dial tone multifrequency (DTMF) capability. DTMF signals could be fed back to the dialing controller whose they could be converted into data for transmission to the storage in the database. Call results could be dialed back into the central database from the keypad of a basic operator telephone set or any other DTMF-capable device.

Using DTMF signals to send information to the central database in a predictive dialing application would allow any DTMF-capable device to be used by the operators. Basic DTMF devices, such as telephones, are inexpensive and can make such a predictive dialing apparatus very affordable, in addition to very useful in applications not requiring the full complexity and multitude of functions provided by a system employing computer terminals at every operator station.

SUMMARY OF THE INVENTION

It is the object of the present invention to provide a predictive dialing method and apparatus which will eliminate the need for computer terminals at the operator stations.

It is also the object of the present invention to provide, in a predictive dialing application, a system for entering call results into a computer database that is more economical to set up and maintain than those systems presently available.

It is the further object of the present invention to provide, in a predictive dialing application, a system for entering call results which allows the system manager to preconfigure which call results which will be allowed, including a call result which might indicate to the database and the dialing controller that the telephone contact should be repeated or not.

The predictive dialing apparatus of the present invention accomplishes these objects comprising a central computer containing a database of prospect records, each said project record including telephone dialing information for making a telephone contact and a field for storing a call data response in relation to said telephone contact; a plurality of DTMF-capable operator devices; and a dialing controller which is operatively connected to a plurality of outside telephone lines and to said central computer as well as to each said operator device, whereby said dialing controller can dial telephone calls on said outside telephone lines based on telephone dialing information received from said central computer and connect each such call to an operator device, said dialing controller including a DTMF signal interpreter to receive DTMF signals representing call data from said operator devices and translates said DTMF signals into call data responses, said dialing controller then transmitting said call data responses to said central computer for storage in relation to their respective prospect records in the database.

The number of outside telephone lines might be greater than the number of operator devices, to allow for the maximization of operator contact time on the telephone.

Acceptable call data responses could be preset in the central computer and enforced by the dialing controller during the handling of telephone calls. This would allow for the enforcement of a standard data collection policy across all of the operator telephones. One of the call data responses which might be returned to the central computer for storage in the database with respect to a prospect record might indicate whether or not that respective telephone contact should be repeated.

The operator devices which could be used could be any type of a DTMF-capable device, including a telephone.

Also disclosed is a method of entering call results in a computer database in a predictive dialing application, said database residing in a central computer and comprising a plurality of prospect records each including telephone dialing information for making a telephone contact and a field for storing a call data response in respect of said telephone contact, said method comprising dialing telephone calls to telephone contacts listed within said database using a predictive dialing apparatus, said predictive dialing apparatus comprising a plurality of DTMF-capable operator devices and a dialing controller operatively connected to said central computer and to a plurality of outside telephone lines as well as to each said operator device, said dialing controller including a DTMF signal interpreter to interpret DTMF signals received from said operator devices, whereby said dialing controller can dial telephone calls on said outside telephone lines based on telephone dialing information received from said central computer, and connect each such call to an operator device. Call data regarding such telephone calls is sent from the operator devices to the dialing controller by way of DTMF signals, which can be translated by the DTMF signal interpreter into a call data response. The call data responses are then in turn transmitted from the dialing controller to the central computer for storage in the database in relation to their respective prospect records.

This method might be practised where the operator devices were telephones.

Data standardization within the method could be established by programming an acceptable range of call data responses into the central computer and allowing the dialing controller to enforce the use of such preset call data responses during the handling of telephone calls. A call data response returned to the central computer might include a response which indicated whether or not that respective telephone contact should be repeated again.

The method and apparatus of the present invention allows for limited feedback to a central database in a predictive dialing application without the need for a computer terminal at each operator system. The use of DTMF tones, which can be generated by almost any telephone or many other devices, allows for a wide range of inexpensive equipment to be used as the operator devices.

The present invention provides a much simplified system which is much more economical for the purchaser to buy and set up, as there is, at minimum, only a standard analog telephone set at each operator station, rather than a computer terminal. Only one computer is needed, which houses the central database and is operatively connected to the dialing controller. The predictive dialer itself could be any dialer with an appropriate interface allowing for the receipt, translation and transfer of DTMF signals from the operator devices to the computer database to be recorded therein in relation to their respective prospect records.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

As outlined above, the present invention concerns a predictive dialing apparatus which uses DTMF-capable devices as operator stations and avoids the need for any computer terminals at each operator station, while preserving the ability for limited feedback to be sent from the operators to the central database and recorded in respect of individual prospect records.

Figure 1:
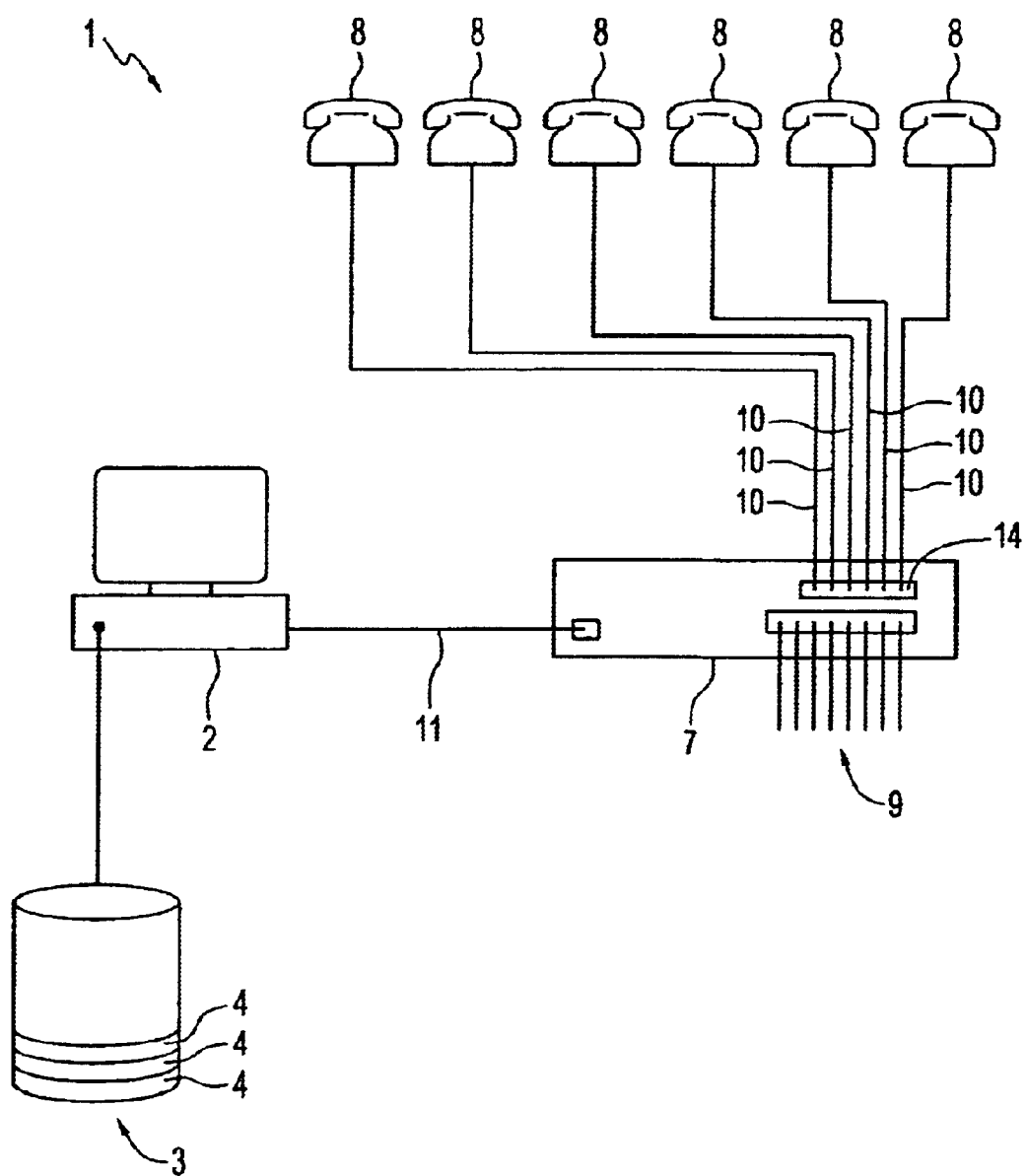
FIG. 1 is a block diagram illustrating the hardware of one embodiment of the system in which the present invention is employed.

One embodiment of this system is shown in FIG. 1. The predictive dialing system (1) first includes a central computer (2) which houses a database (3) of prospect records. Each prospect record (4), as is demonstratively shown in FIG. 1, contains at a minimum telephone dialing information (5) which can be fed to the dialing controller (7) to initiate a telephone call, as well as containing a field in which a call data response (15) can be recorded based on feedback received from the operator devices (8).

The central computer (2) might be any of a number of different computers or collections of computers under a number of different operating systems. The computer could be, for example, a personal computer, a mini-computer, a main frame computer or a computer running in a distributed network of other computers. The specific choice of computer is limited only by processing and disk storage requirements, along with the requirement for bi-directional communication with the dialing controller (7).

The system (1) includes a plurality of operator devices (8). In the illustrated embodiment, each operator devices (8) is a DTMF-capable telephone. Dial tone multi-frequency (DTMF) capability means that the operator devices (8) generate audio frequencies upon being actuated, which dial tone multi-frequency output can be interpreted by the proper DTMF signal interpreter and converted into usable data. The operator devices (8) represent the universe of DTMF-capable telephones connected to public telephone lines and networks.

The core of the predictive dialing system (1) of the present invention is the dialing controller (7). The dialing controller (7) is operatively connected to the central computer (2) such that bi-directional communication between the central computer (2) and the dialing controller (7) is possible.

In addition to being operatively connected to the central computer (2), the dialing controller (7) is also connected to a plurality of outside telephone lines (9) on which telephone calls (14) can be made, as well as being connected to each of the operator devices (8). The central computer (2) will send telephone dialing information (5) from a prospect record (4) in the database (3) to the dialing controller (7). The dialing controller (7) will dial a telephone call (14) on an available outside telephone line (9) corresponding to the telephone dialing information (5) received from the central computer (2). The dialed telephone call (14) can then be connected to a free operator telephone (8), when such becomes available. Once the telephone call (14) is completed, the dialing controller (7) will send back call data (6) to the central computer (2) for storage in relation to its respective prospect record (4), as outlined in further detail below.

The dialing controller (7) includes a DTMF signal interpreter (14) which can receive and interpret DTMF signals, representing call data, from each operator telephone (8) and convert said DTMF signals into a call data responses (15) which can be transmitted to the central computer (2) by the dialing controller (7) with such identifying information as necessary to allow the central computer (2) to store the call data response (15) in relation to the proper prospect record (4).

The key to rendering this low-cost predictive dialing alternative viable is the DTMF signal interpretation function, which allows for the receipt of DTMF signal feedback from an operator device (8) in respect of a completed telephone call. DTMF signals received by the dialing controller (7) through its DTMF signal interpreter (14) are converted to digital data by the DTMF signal interpreter (14) and made available to the central database (3) by transmission of such digital data from the dialing controller (7) to the central computer (2). The digital data yielded by the DTMF signal interpreter (14) are call data responses (15), which are stored in the database (3).

To outline procedurally the operation of the predictive dialing system (1) of the present invention. The central computer (2) selects the next prospect record (4) in the database (3) on which a telephone contact call is to be made. The telephone dialing information (5) pertaining to that prospect record (4) is transmitted to the dialing controller (7) when the dialing controller (7) signals to the central computer (2) that there is an outside line (9) available and that the dialing controller (7) is ready to make a telephone call on such outside line (9). Upon receipt of telephone dialing information (5) from the central computer (2), the dialing connection (7) dials a telephone call (13) on the available outside line (9). This telephone call (13) is then connected to an available operator telephone (8). An operator at such an operator telephone (8) can then conduct whatever type of telephone conversation is necessary with the person being contacted and either upon completion of the telephone call or alternatively upon some other terminating event, such as a busy signal or line out of service, the operator of the operator telephone (8) can log a call result back into the central database (3) with respect to the prospect record (4) in question.

Some other terminating events which might be wished to be logged into the database would be where the decision maker was not at home, if a babysitter answered the telephone or if it was an inconvenient time for the party receiving the call to talk. In the case of a busy signal or a non-answered telephone call, it might also be possible for the dialing controller to automatically detect this and for the dialin controller itself to automatically log a certain call result back into the database respecting that prospect record.

One of the types of call data response (15) which could be sent back to the database (3) from the operator telephone (8) could be a flag to either repeat a contact with a certain prospect record (4) upon a subsequent pass through the database (3), or alternatively to avoid repeating a contact with either a bad record or where a negative telephone response was received.

Various different call data responses (15) could be recorded in the central database (3), each of which standardized call data responses (15) could be used in a statistical analysis or otherwise of the results of the telephone campaign. For example, a "1" might mean a positive response, a "2" might mean a negative response, a "3" might mean they need someone else to call them back with further information, a "4" might mean that there was no one there and that another call should be made or that the call should otherwise be repeated, or a "5" might mean a negative response along with the requested or suggested removal of the prospect record (4) in question from any further telephone contact. It will be understood that any various type of call data response scheme could be used insofar as could be accomplished using one or more DTMF signals. For example, where a single DTMF tone only was to be used, up to 12 different call data responses (15) could be recorded in the database (3). Where two digits were used to comprise the call data responses (15), the number would increase from 12 to over 100. If even further specificity was required, more than two digits or two DTMF signals could be used in the relaying of call data back to the dialing controller (7).

The call result is logged back to the database (3) from the operator telephone (8) by generating a DTMF signal (6) from the operator telephone (8). These DTMF signals (6) will be received by the DTMF signal interpreter (14) in the dialing controller (7) and converted into a call data response (15) which can then be transmitted back to the central computer (2) for storage with respect to the proper prospect record (4).

In a predictive dialing system such as the one shown (1), when the last prospect record (4) in the database (3) is reached, the computer (2) cycle back to the beginning of the database (3) to repeat contact with any prospect records (4) which are flagged for repeat contact in the database (3).

It will be understood that any predictive dialer or dialing controller which accomplishes the object of relaying information from an operator device to the computer database by way of DTMF signals from the operator device to the dialing controller or predictive dialer, is contemplated within the scope of the present invention.

Figure 2:
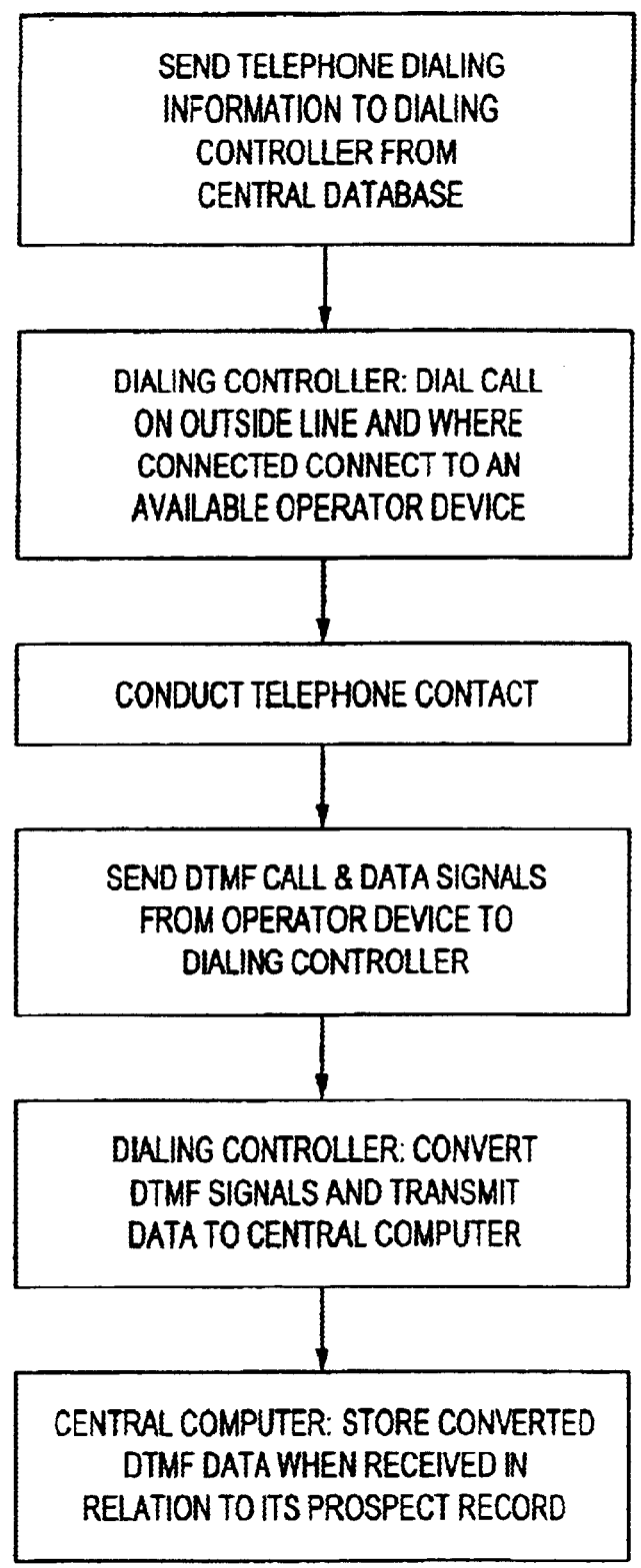
FIG. 2 is a flow diagram of the method of the present invention.
Figure 3:
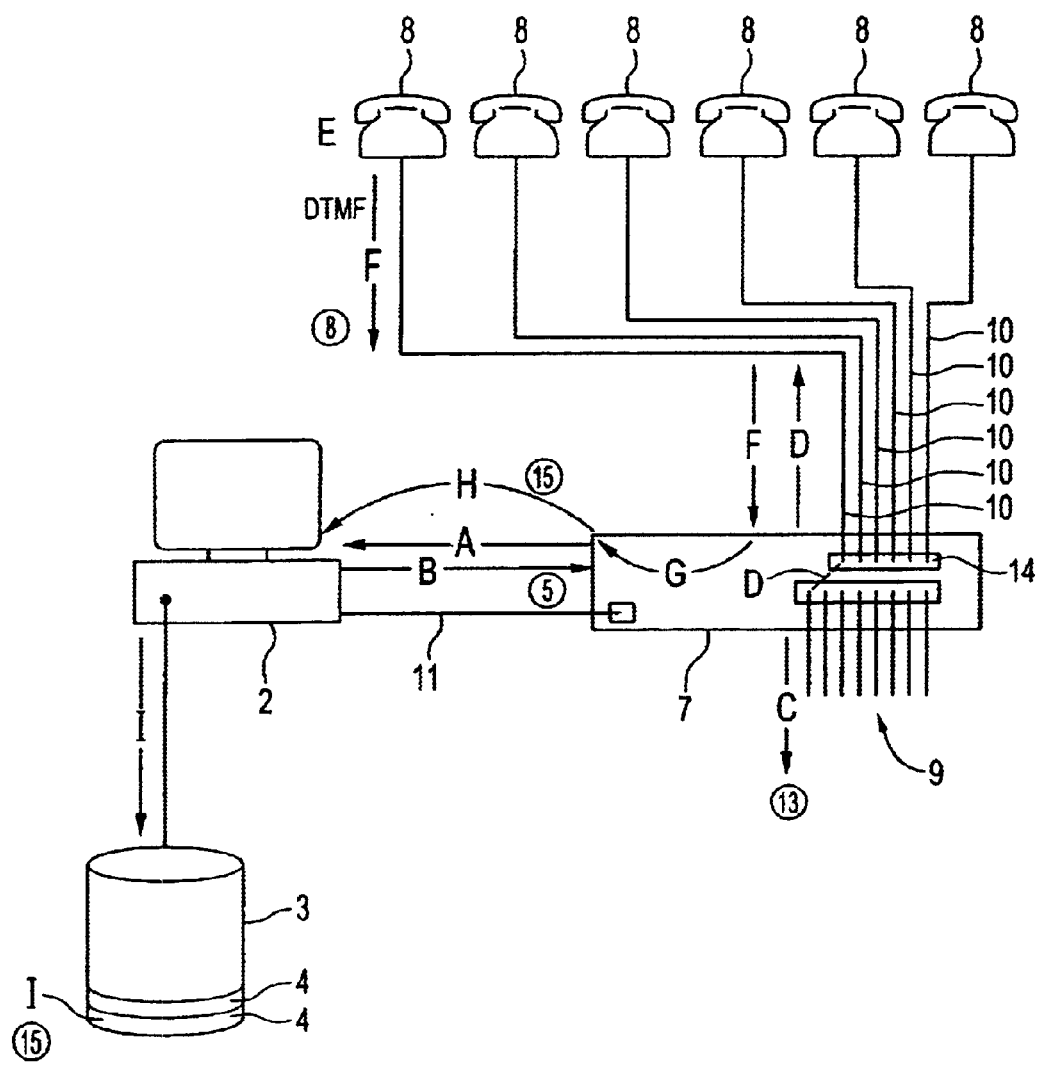
FIG. 3 demonstrates the method of FIG. 2 practised in the embodiment of FIG. 1.

FIGS. 2 and 3 demonstrate the method of the present invention. FIG. 2 demonstrates in an overall flow diagram the subject matter of the method of the present invention, namely transmitting call data from an operator device by way of a DTMF signal back to the dialing controller, where it is converted into digital data for transmission to and storage in the prospect database in the central computer. FIG. 3 shows in more detail the operation of the method of the present invention if the embodiment of FIG. 1 were used as the apparatus.

As outlined in FIG. 2, the first step in the method is to send telephone dialing information to the dialing controller (7) from the prospect database (3). The dialing controller will then dial a telephone call on an outside and connect that telephone call (13) to an available operator device (8). The operator of the associated device (8) will conduct a telephone contact at that time and, upon completion of the telephone call, will send call data (6) back to the dialing controller (7) from the operator device (8) by way of DTMF signals. The DTMF signal interpreter (14) incorporated in the dialing controller (7) will convert these DTMF signal call data (6) into a call data response (15) which can be transmitted back to the prospect database (3) for storage in relation to its respective prospect record (4). The dialing controller (7) can be adapted to run several such telephone calls and processes at the same time.

FIG. 3 demonstrates this method in more detail. Upon sensing a free outside line, shown at A, the dialing controller (7) will request telephone dialing information (5) from the central computer (2). The computer (2) will transmit telephone dialing information (5) from a prospect record (4) to the dialing controller (7). The dialing controller (7) will then dial a telephone call (13) on the free outside line (9) and connect that telephone call (13) to an available operator device (8), shown at D. The operator will then conduct a telephone contact, shown as E, and upon completion of the telephone contact will transmit call data (6) back to the dialing controller (7) from the operator device (8), in the form of DTMF signals, shown at stage F of FIG. 3. Shown next at G is the translation of the DTMF signals transmitted from the operator device (8) in question into data, being a call data response (15), which can be transmitted back to the computer (2) for storage in the proper prospect record (4) of the database (3). This is shown at G. Upon completion of the translation, the converted call data response (15) is transmitted to the central computer, shown at H. Finally, shown at J, the call data response (15) is stored in the prospect database (3) as a call data response in respect of its related prospect record (4).

It will be understood that any type of a DTMF-capable device which allowed for the conduct of a telephone contact and the feedback of call data (6) to the dialing controller by way of DTMF signals are contemplated within the scope of the present invention.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

Listing of diagram reference numerals:

| | |
|---|---|
| 1. | predictive dialing system; |
| 2. | central computer; |
| 3. | database; |
| 4. | prospect record; |
| 5. | telephone dialing information; |
| 6. | call data (DTMF); |
| 7. | dialing controller; |
| 8. | telephone; |
| 9. | outside line; |
| 10. | internal system telephone line; |
| 11. | computer/dialer connection; |
| 12. | keypad; |
| 13. | telephone call; |
| 14. | DTMF signal interpreter; |
| 15. | call data response; |

I claim:

1. A predictive dialing apparatus, said apparatus comprising:
   a) a central computer containing a database of prospect records, each said prospect record including telephone dialing information for making a telephone contact and a field for storing a call data response in relation to said telephone contact;
   b) a plurality of DTMF-capable operator devices;
   c) a dialing controller which is operatively connected to a plurality of outside telephone lines and to said central computer as well as to each said operator device, whereby said dialing controller can dial telephone calls on said outside telephone lines based on telephone dialing information received from said central computer, and connect each such call to an operator device, said dialing controller including a DTMF signal interpreter to receive DTMF signals representing call data from said operator devices and translate said DTMF signals into call data responses, said dialing controller transmitting said call data responses to said central computer for storage in relation to their respective prospect records.

2. The apparatus of claim 1 wherein the number of outside telephone lines is greater than the number of operator devices.

3. The apparatus of claim 1 wherein a series of allowable call data from said operator telephones can be preset in said central computer and enforced by said dialing controller.

4. The apparatus of claim 3 wherein a call data response indicates whether its respective telephone contact should be repeated.

5. The apparatus of claim 1 wherein said operator devices are telephones.

6. A method of entering call results in a computer database in a predictive dialing application, said database residing in a central computer and comprising a plurality of prospect records each including telephone dialing information for making a telephone contact and a field for storing a call data response in respect of said telephone contact, said method comprising:
   a) dialing telephone calls to telephone contacts listed within said database using a predictive dialing apparatus, said predictive dialing apparatus comprising a plurality of DTMF-capabale operator devices and a dialing controller operatively connected to said central computer and to a plurality of outside telephone lines as well as to each said operator telephone, said dialing controller including a DTMF signal interpreter to interpret DTMF signals received from said operator devices, whereby said dialing controller can dial telephone calls on said outside telephone lines based on telephone dialing information received from said central computer, and connect each such call to an operator device;
   b) sending call data regarding said telephone calls from said operator devices to said dialing controller as DTMF signals;
   c) translating said DTMF signals into call data responses;
   d) transmitting said call data responses from said dialing controller to said central computer; and
   e) storing said call data responses in said database in relation to their respective prospect records.

7. The method of claim 6 wherein said operator devices are telephones.

8. The method of claim 6 wherein a range of allowable call data from said operator telephones can be preset in said central computer and enforced by said dialing controller during the handling of telephone calls.

9. The method of claim 8 wherein a call data response returned to the central computer indicates whether its respective telephone contact should be repeated.

* * * * *